(12) United States Patent
Bates

(10) Patent No.: US 6,707,457 B1
(45) Date of Patent: Mar. 16, 2004

(54) MICROPROCESSOR EXTENSIONS FOR TWO-DIMENSIONAL GRAPHICS PROCESSING

(75) Inventor: Matthew Damian Bates, Austin, TX (US)

(73) Assignee: Conexant Systems, Inc., Newport Beach, CA (US)

( * ) Notice: Subject to any disclaimer, the term of this patent is extended or adjusted under 35 U.S.C. 154(b) by 0 days.

(21) Appl. No.: 09/409,819

(22) Filed: Sep. 30, 1999

(51) Int. Cl.[7] .................................................. G06T 1/00
(52) U.S. Cl. ...................................... 345/503; 345/557
(58) Field of Search ........................ 345/557, 536–538, 345/502, 563, 531, 27; 711/118, 105, 121, 126; 463/43

(56) References Cited

U.S. PATENT DOCUMENTS

| | | | | |
|---|---|---|---|---|
| 5,229,758 A | * | 7/1993 | Hsu ............................ | 345/27 |
| 5,757,376 A | * | 5/1998 | Suzuoki et al. ............. | 345/581 |
| 5,787,267 A | * | 7/1998 | Leung et al. ............... | 711/105 |
| 5,791,994 A | * | 8/1998 | Hirano et al. ................. | 463/43 |
| 5,990,910 A | * | 11/1999 | Laksono et al. ............ | 345/503 |
| 6,359,624 B1 | * | 3/2002 | Kunimatsu .................. | 345/503 |

* cited by examiner

Primary Examiner—Kee M. Tung
(74) Attorney, Agent, or Firm—Procopio Cory Hargreaves & Savitch

(57) ABSTRACT

Embodiments of the invention comprise a new device and technique to realize an improved graphics generation system. This improvement is preferably achieved by implementing an interface logic portion to interface with the CPU, a control register portion, a pixel FIFO array portion, a pixel processing logic portion, and a control logic portion. These portions are preferably implemented as an extension of the internal architecture of the CPU. The CPU may be attached to the graphics system via a data cache and a write buffer portion. Data is read from the system memory and placed in the data cache so that subsequent accesses to the same location only require access to the cache. System memory data is written to a write buffer, so that the data written may be queued up and sent to the main memory at an appropriate time. The display refresh controller also reads the data from the system memory and converts the data to a signal for output to a display.

31 Claims, 3 Drawing Sheets

MICROPROCESSOR EXTENSIONS FOR TWO-DIMENSIONAL GRAPHICS PROCESSING

FIELD OF THE INVENTION

This invention relates generally to the generation of graphics signals. More specifically, preferred embodiments of this invention relate to an apparatus, system, and method for the generation of two-dimensional computer graphics at a relatively low cost.

DESCRIPTION OF THE RELATED ART

In conventional graphics generation systems, in order to enhance a Central Processing Unit ("CPU") so as to achieve an improved graphics generation, a graphics processor is utilized. However, the conventional graphics processor comprises a separate logic device that, in turn, requires a separate set of circuitry.

More specifically, the conventional solution is to add a dedicated two-dimensional graphics processor to the system. The graphics processor is programmed by the system CPU and carries out the graphics processing independently. Also, the graphics processor is considered to be a "peripheral" device that adds an additional cost and/or more complexity to the system.

Yet another conventional solution involves adding single instruction-multiple-data instructions, e.g., by utilizing conventional MMX techniques to enhance the graphics generation performance. However, an MMX system has to load operands one word at a time and cannot automatically perform two-dimensional operations. Also, additional instructions are required to combine the operands for the desired operation before storing the result back into memory.

Conventional graphics processors require a number of additional functions and/or devices. These functions and/or devices may comprise at least one of, e.g., the addressing logic, the memory interface with additional arbitration, the read caches and write buffers, a command interface, and various kinds of micro-programmed control units.

With a conventional graphics processor, it is necessary to either duplicate some of the address translation logic, or to perform the translation in the software. Either the address translation logic, or the software translation, is required so that the application can work with the virtual addresses, while the hardware works with the physical addresses.

If the address translation logic solution is chosen, this additional logic hardware results in an additional cost. Alternatively, if the software translation solution is chosen, a relatively lower logic hardware cost results. But this software translation solution has at least two additional disadvantages. First, the address protection provided by the memory management unit is lost. This loss of memory management address protection thus increases the chances of system failures in this software translation solution. Second, a linear region of virtual addresses may not necessarily translate into a contiguous region in physical memory space, if a paged system is employed in this software translation solution. Therefore, the software not only has to translate the addresses, but must also break up any single two-dimensional graphics operations into multiple operations that operate separately on each page, thus resulting in additional overhead. This additional overhead reduces the graphics performance in the conventional graphics processor implementations.

Accordingly, there is an industry need for a device and method for the generation of computerized graphics at a relatively low cost.

SUMMARY OF THE DISCLOSURE

Embodiments of the present invention are best understood by examining the detailed description and the appended claims with reference to the drawings. However, a brief summary of embodiments of the present invention follows.

Briefly described, an embodiment of the present invention comprises a device and a method that provides for the improvement of a computerized graphics generation system. A preferred embodiment comprises a two-dimensional graphics generation system that is implemented at a relatively low cost.

For example, in a preferred embodiment, the graphics coprocessor is comprised of adding a relatively minimal amount of logic so as to achieve a high performance two-dimensional graphics output from a computerized system. In this exemplary embodiment, the graphics coprocessor is attached to the side of a CPU. In other words, the graphics coprocessor is essentially an extension of the internal architecture of the CPU and, therefore, not considered to be a "peripheral" device. In alternate arrangements, the CPU may be located between the bus and the graphics coprocessor.

In a preferred arrangement, the CPU is attached to the system via a data cache and a write buffer. In this preferred arrangement, the data that is read from a system memory is also placed in the data cache so that a subsequent access to the same data will only require access the cache. Thus, the data that is written to the system memory is also written to a write buffer, so that any writes that occur may then be queued up and sent to the main memory at an appropriate time. Further, the display refresh controller also reads the data from the system memory and converts the data into a signal so that it may be sent to a display.

Specifically, in this preferred arrangement, an embodiment of the invention sits essentially "behind" the data cache/write buffer in the same way that the CPU is oriented. Thus, the graphics coprocessor obtains essentially the same performance benefits that the CPU enjoys.

In another preferred embodiment, the graphics coprocessor may be implemented into a computer system where the CPU already provides for a mechanism to extend the internal architecture. One arrangement of this exemplary embodiment is to combine the graphics coprocessor with an ARM940-type device. Of course, alternate embodiments may be utilized with any CPU that may be so configured. Also, alternate embodiments may be utilized with any CPU where relatively simple internal modifications may be made, so as to allow these additional instructions to be routed to a coprocessor.

These additional instructions may be preferably provided by an exemplary arrangement that comprises an interface logic portion to interface with the CPU, a control register portion, a pixel First In First Out ("FIFO") array, a pixel processing logic portion and a control logic portion.

The interface logic portion provides a interface mechanism for the CPU to route the additional or new instructions to the graphics coprocessor together with any associated data. This interface logic portion also provides a path for returning the data and for providing hand-shake signals to inform the CPU when an instruction is complete.

The control register portion is preferably configured by the application software. This control register portion performs a control of the coprocessor operation. The control register portion is preferably a subset of the conventional control registers that comprise at least a portion of a conventional graphics processor. Also, parameters such as pixel counts, bits per pixel, raster operation codes, and foreground and background colors, and the like, may comprise a portion of these control register portions.

The FIFO array portion is preferably a memory device that may be configured to be between one and four FIFO's, inclusively, depending upon the number of operands involved in the preferred two-dimensional graphics operation. Specifically, the input pixel data is loaded into these FIFOs. Also, the pixel processing logic processes the pixel data for the desired two-dimensional graphics rendering effect. Then the control logic portion controls the operation of the coprocessor, preferably utilizing a state machine.

Other arrangements and modifications will be understood by examining the detailed description and the appended claims with reference to the drawings.

BRIEF DESCRIPTIONS OF THE DRAWINGS

Embodiments of the present invention are described in detail herein with reference to the drawings in which.

The accompanying drawings, wherein like numerals denote like elements, are incorporated into and constitute a part of the specification, and illustrate presently preferred exemplary embodiments of the invention. However, it is understood that the drawings are for purpose of illustration only, and are not intended as a definition of the limits of the invention. Thus, the drawings, together with the general description given above, and the detailed description of the preferred embodiments given below, together with the appended claims, serve to explain the principles of the invention.

DETAILED DESCRIPTION OF PREFERRED EMBODIMENTS

The accompanying drawings refer to and illustrate descriptions of exemplary embodiments of the present invention. It is to be understood that other embodiments may be practiced, and structural changes and/or implementation variations may be made and utilized without departing from the scope and spirit of the invention described herein.

Figure 1:
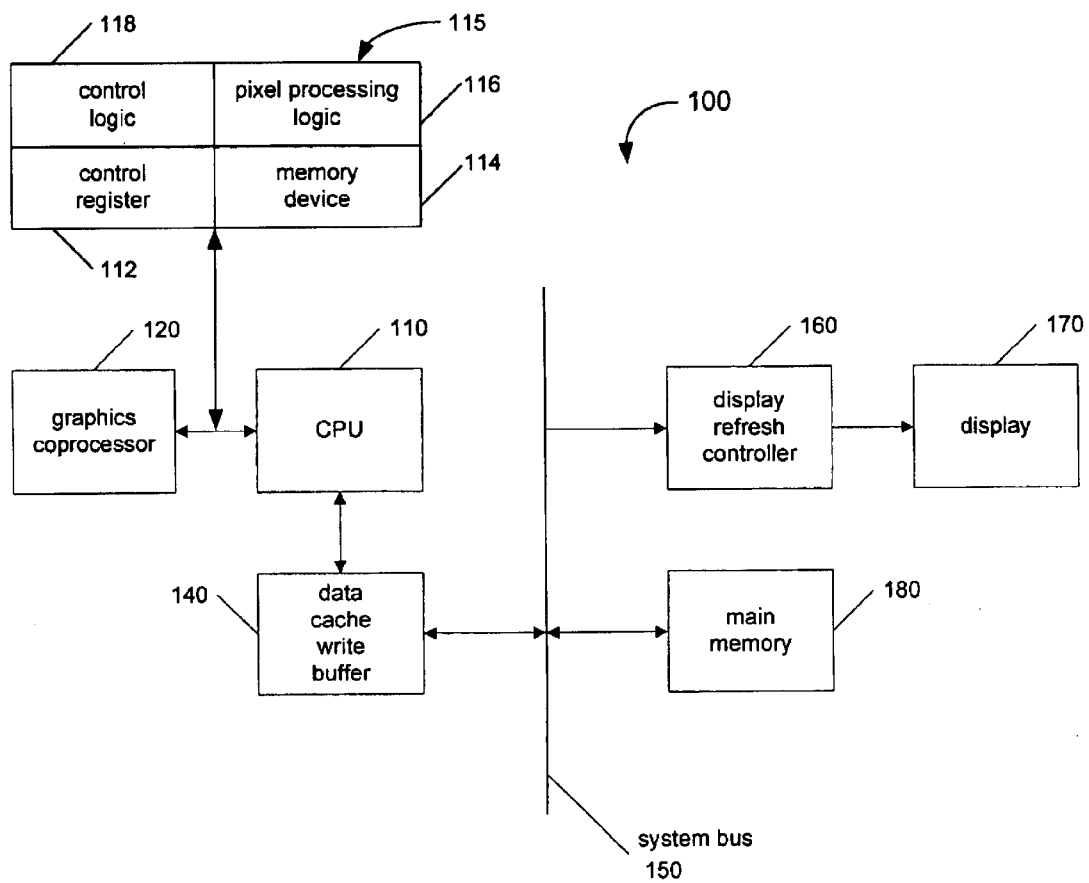
FIG. 1 is an illustration of a simplified block diagram of an exemplary system configuration, in accordance with the principles of an embodiment of the present invention.
Figure 2:
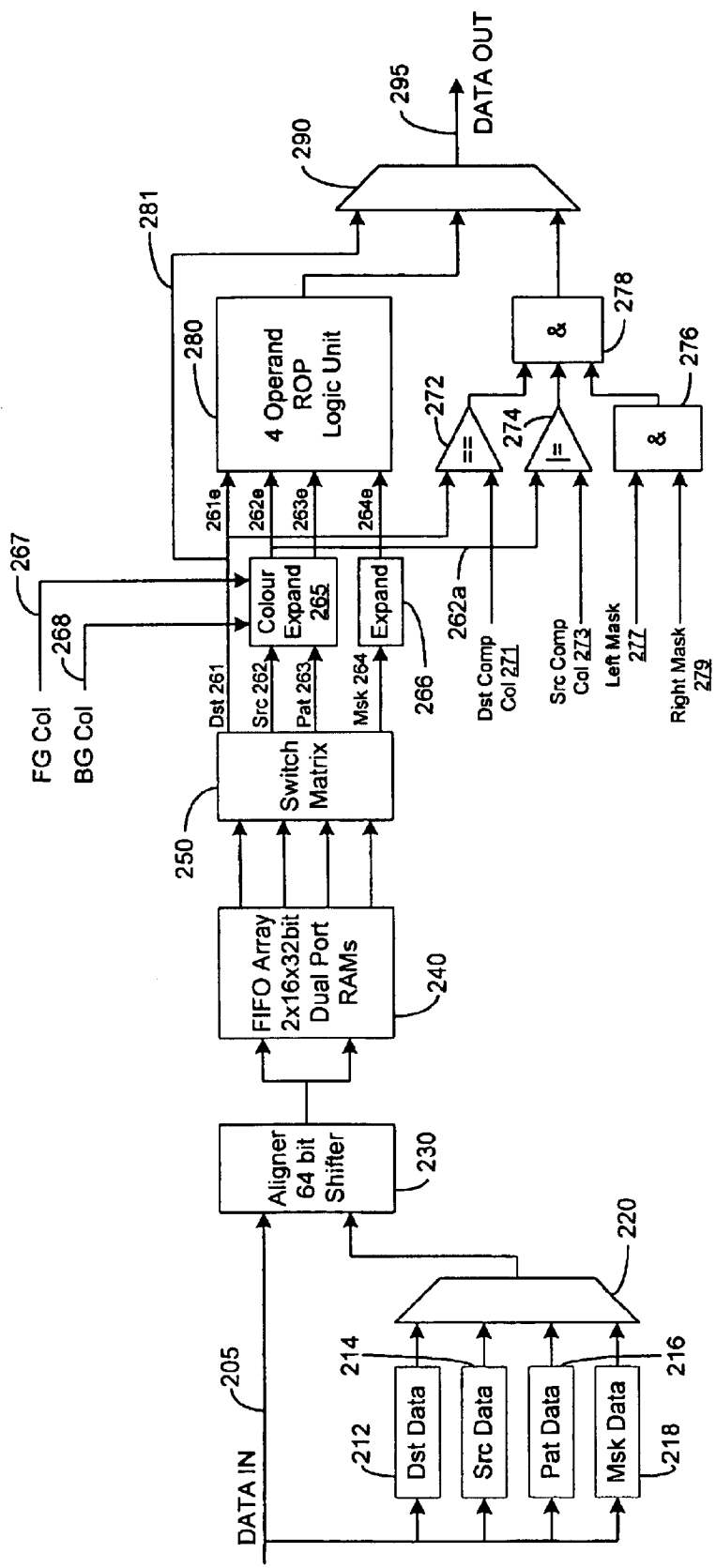
FIG. 2 is an illustration of a simplified block diagram of an exemplary data path configuration, in accordance with the principles of an embodiment of the present invention.

Various embodiments of the present invention are illustrated utilizing a two-dimensional graphics generation system device 100 of FIG. 1. FIGS. 1–2 illustrate various techniques in the practice of various embodiments of the present invention. It will be understood by one skilled in the art that, e.g., various components of the system, as illustrated in FIGS. 1–2, are not shown in order to simplify the illustrations.

The following detailed description first describes an overview of an embodiment of the present invention. Next, with reference to FIGS. 1–2, a detailed discussion of exemplary embodiments of the present invention are described. Finally, a detailed description of specific exemplary embodiments is set forth. However, it will be understood by one skilled in the art that any of these embodiments, as described herein, are merely exemplary. Thus, aspects of the present invention are broad in scope so as to not be limited to the specific detailed exemplary embodiments as described herein.

FIG. 1 illustrates a two-dimensional graphics generation system device 100 that comprises an exemplary embodiment of the present invention. In a preferred embodiment, the graphics coprocessor is comprised of adding a relatively minimal amount of logic so as to achieve a high performance two-dimensional graphics output from a computerized system. Bursts of multiple operands can be loaded from memory at the maximum available bandwidth. The result is then immediately available to be stored, again at the maximum available bandwidth. Thus, as shown in FIG. 1, the graphics generation system may preferably be implemented at a relatively low cost.

In this exemplary embodiment as illustrated in FIG. 1, the graphics coprocessor 120 is attached to the side of a CPU 110. In other words, the graphics coprocessor is essentially an extension of the internal architecture of the CPU 110. Thus, preferred embodiments of the present invention are not considered to be a peripheral device, unlike conventional graphics processors.

While in various preferred embodiments of the present invention, for example, as shown in FIG. 1, the graphics co-processor 120 is illustrated as connected to the CPU 110, various alternate arrangements are within the scope of the present invention. For example, the graphics coprocessor 120 may be a separate stand-alone unit that is merely connected to the CPU 110, so that the functionality described herein may be achieved. In yet another alternate embodiment, the graphics co-processor 120 may be incorporated totally within CPU 110 and not be either separate or a stand-alone device. Other arrangements and embodiments of the instant invention will be understood by one skilled in the art that many arrangements are possible in implementing the herein described logic and/or software implementation of the instant invention. Thus, it will be understood that any embodiment of the instant invention is only limited so as to not be directly connected to the bus prior to connection with the CPU 110.

As shown in FIG. 1, the CPU 110 is attached to the system bus 150 via a data cache and a write buffer 140. Connected to the system bus 150 are a system, or main memory 180, and a display refresh controller 160. The display refresh controller 160 output is connected to the display 170.

In this arrangement, the data that is read from the main memory 180 is also placed in the data cache 140. The data is placed in the data cache 140 so that subsequent accesses to the same location need only require access to the data cache 140. The data that is written to the main memory 180 is also written to a write buffer 140. The data is written to the write buffer 140 so that the "writes" may be queued up and sent to the main memory 180 at an appropriate time. Finally, the display refresh controller 160 reads data from the main memory 180 and then provides a signal that is sent to the physical display 170.

Specifically, in this preferred arrangement, the graphics processor sits essentially "behind" the data cache/write buffer 140 in the same way that the CPU 110 is oriented. Thus, an embodiment of the invention may achieve essentially the same performance benefits that the CPU 110 enjoys.

In contrast, for a conventional graphics processor to achieve the same performance benefits of this exemplary embodiment, the conventional graphics processor would have to duplicate the data cache/write buffer 140. However, duplicating the data cache/write buffer 140 would likely require a considerable additional expense.

An embodiment of the invention is intended to extend the capabilities of a low cost CPU by adding minimal logic for high performance two-dimensional graphics. Embodiments of the present invention can be applied to any system that may comprise, e.g., a Central Processing Unit ("CPU") that, in turn, comprises at least a memory and an output for a display 170.

Alternate embodiments of the invention may be implemented into a computer system where the CPU already provides for a mechanism to extend the internal architecture. One arrangement of these alternate embodiments with an extendable internal architecture comprises utilizing an ARM940 CPU. Of course, alternate embodiments may be utilized with any CPU that may be so configured. Also, alternate embodiments may be utilized with any CPU, where relatively simple internal modifications may be made so as to allow these additional instructions to be routed to a coprocessor.

Components of a preferred embodiment of the invention comprise an interface logic portion 115 so that the graphics coprocessor may couple and/or interface, e.g., with the CPU. This direct graphics coprocessor coupling and/or interface 115 provides access to at least one of the control register portion 112, a pixel FIFO array portion 114, a pixel processing logic portion 116, and the control logic portion 118. In the preferred embodiment illustrated in FIG. 1, the graphics coprocessor utilizes a connection with the CPU to ultimately communicate with all of these other components. Thus, the graphics coprocessor 120 may interface with the CPU 110 without using the system bus 150.

The interface logic portion 115 provides a an interface mechanism for the CPU to route the additional, or new, instructions to the graphics coprocessor, together with any associated data. This interface logic portion 115 also provides a path for returning the data, and for providing hand-shake signals to inform the CPU when an instruction is complete.

The control register portion 112 is preferably configured by the application software. This control register portion 112 performs a control of the coprocessor operation. The control register portion 112 is preferably a subset of the conventional control registers that comprise at least a portion of a conventional graphics processor. Also, parameters such as pixel counts, bits per pixel, raster operation codes, and foreground and background colors, and the like, may comprise a portion of these control register portions 112.

The FIFO array portion 114 is preferably a memory device that may be configured to be between one and four FIFO's, inclusively, depending upon the number of operands involved in the preferred two-dimensional graphics operation. Specifically, the input pixel data is loaded into these FIFOs. Also, the pixel processing logic portion 116 processes the pixel data for the desired two-dimensional graphics rendering effect. Then, the control logic portion 118 controls the operation of the coprocessor, preferably utilizing a state machine.

The instructions that are preferably added comprise instructions to read and write graphics control registers, and instructions to load and store pixel data. Some parameters and/or functions that are related to these instructions may comprise, e.g., the foreground/background colors, the raster operation, and the pixel count.

In the preferred arrangement illustrated in FIG. 1, an embodiment of the invention extends the CPU 110 with 3 new instructions:

---
MGR cn, rn,
PXL [m], fn,     and
PXS [rn].

---

The MGR instruction is tasked with moving a CPU general purpose register to one of the graphics coprocessor registers, where cn represents the coprocessor register and rn represents the CPU register. The PXL instruction is tasked with loading pixel data from the memory into an internal FIFO, where rn represents a CPU register specifying the main memory 180 address, and fn represents the FIFO number. The PXS instruction is tasked with storing pixel data to the memory, where rn represents a CPU register specifying the main memory 180 address.

In the case of either the PXL and the PXS instruction, the number of words transferred is not limited to one. For example, the transfer can comprise a burst of multiple words, where the count is determined by the graphics coprocessor.

It is understood by one skilled in the art that FIG. 2 illustrates a simplified block diagram showing the data path inside the coprocessor. However, many other details, such as control registers, state machines, and addressing logic are not shown for clarity.

As shown in FIG. 2, the data path comprises the pixel FIFO array 240 and the pixel processing logic. The pixel FIFOs 240 may be implemented, e.g., with two 16×32 bit dual port random access memory ("RAM") devices.

The pixel data is input from the CPU 110 via the data input port 205, and then aligned by a shifter 230 before being written to the FIFO array 240. Thus, when the received pixel data is loaded, the pixel data is read into the FIFO's 240 via the shifter 230 to correct the relative alignments of the various operands.

To cope with misalignment between the various operands, the shifter 230 is extended with data stored from the previous input. The four data registers 212, 214, 216, 218 illustrated in FIG. 2 hold the data from the previous cycle. This data is provided to the shifter 230 via the multiplexer 220. This previous input data storage occurs because there can be multiple pixels within words, and the source and destination pixel addresses may not be the same within a word. Thus, the data is held because the alignment correction may require that some bits are shifted in from the previous word.

Data is then written out of the FIFOs 240 when pixels are to be stored back into memory. The data is output from all the FIFOs 240 in parallel and then combined. First, a switch matrix 250 organizes the data from the FIFO array 240 into the various operands because their position in the array 240 is dependent upon the operation type.

In a preferred embodiment of the present invention, up to four operands are allowed. These four operands comprise a destination 261, a source 262, a pattern 263, and a mask 264.

Next, the source and pattern are optionally expanded from 1 bit per pixel to N bits per pixel, where N is the destination bits per pixel. Pixels are also expanded to either the foreground or background color 267, 268 in the colour expand unit 265, and the mask 264 is always expanded in the mask expand unit 266.

Then, the operands are logically combined according to the chosen raster operation. The four operands 261e, 262e, 263e, 264e, that are all at the final bit depth, are combined in the logic unit 280 by utilizing 1 of 65,536 logic operations.

Also, the source 261 and destination 262a pixels are compared with the source and destination compare colours 273, 271, respectively, in parallel. Together, with the left and right margin masks 277, 279, the results are utilized to select either the rastor operation ("ROP") result or the original destination.

Finally, a multiplexer 290 routes either the result pixels or the unmodified destination pixels 281 to the data output port 295. The select logic for the multiplexer 290 comprises pixel comparators 272, 274 and the left and right margin masks unit 276. The pixel comparators 272, 274 allow for various special effects. For example, one special effect comprises the technique of only writing those pixels in the source that do not match a specific color. This effect is also known as color keying.

The left and right margin masks 277, 279 are calculated automatically by the hardware to cope with the edge conditions. The edge conditions may exist due to rectangles that may start or stop at non-word boundaries and therefore require that only a subset of the pixels within those words be modified.

In operation, an embodiment of the invention comprising a graphics coprocessor operates by being programmed by the application software. First, as is described in this example, the graphics coprocessor must configure all the control registers in the coprocessor by utilizing the MGR instruction. Then, the graphics coprocessor must load the FIFO array with the operands that are involved in the desired raster operation by utilizing one PXL instruction for each operand. Finally, the graphics coprocessor stores the resulting pixels by utilizing a PXS instruction.

If more pixels are to be processed than will fit into the FIFO array, then the operation has to be repeated.

The CPU provides or accepts only contiguous words of data, until the CPU is told to stop by the coprocessor. However, a rectangular region is usually not contiguous in memory space. Thus, the CPU must issue new PXL and/or PXS instructions at the start of each line so that a new memory address can be supplied.

As an example, the following code excerpt illustrates the copying of a two-dimensional rectangle:

Loop:

| PXL | [r1], gcp_fifo_src | ; r1 initially represents the address of the top-left pixel in the source. |
|---|---|---|
| PXL | [r0], gcp_fifo_dst | ; r0 initially represents the address of top-left pixel in the destination. |
| ADD | r1, r1, r3 | ; calculates the start of next line by adding a source pitch. |
| ADD | r0, r0, r2 | ; calculates the start of the next line by adding a destination pitch. |
| PXS | [r0] | ; stores the resulting pixels to the destination. |
| SUBS | r4, r4, #1 | ; r4 is a line counter. |
| BNE | Loop | ; loops if there are still lines left to perform |

This exemplary loop assumes that the coprocessor control registers have already been loaded. Note that, to perform a copy operation, it is not always necessary to perform the PXL instruction for the destination. However, in general, performing the PXL instruction for the destination is the simplest method of coping with any edge conditions that may be encountered.

There are some advantages that may be achieved in the practice of this exemplary embodiment. It will be understood that various embodiments of the invention may likely provide for a relatively high performance at a relatively low cost. For example, only the logic that enhances the existing capabilities of the CPU is required. Thus, an embodiment of the present invention may eliminate the requirement in conventional graphics processors for a number of functions and/or devices. These functions and/or devices may comprise at least one of, e.g., the addressing logic, the memory interface with additional arbitration, the read caches and write buffers, a command interface, and various kinds of micro-programmed control units that may be utilized to handle the above exemplary complicated rectangle coordinate processing.

In an embodiment of the invention, all of these functions and/or devices may be performed in the following manner. First, some and/or all may be performed in software, e.g., comprising some of the addressing logic and rectangle coordinates processing. Second, some and/or all may be performed by existing hardware, e.g., comprising some of the memory interface, the data cache and the write buffer. Third, some may not be required at all, e.g., an additional arbitration, and a command interface.

Also, it is especially advantageous for a graphics processor to have a data cache when rendering text. This advantage for rendering occurs because, in at least some instances, the source data is a single font definition that is repeatedly accessed as each character is rendered to the destination.

As mentioned earlier, the coprocessor is able to utilize the CPU's memory interface, the data cache, and the write buffer. However, another advantage of utilizing the CPU's facilities may be realized in alternate embodiment systems that comprise a memory management unit with virtual addressing.

With a conventional graphics processor, it is necessary to either duplicate some of the address translation logic, or to perform the translation in the software. One of these two translation techniques is required so that the application can work with the virtual addresses while the hardware works with the physical addresses. Obviously, however, additional address translation logic is likely to incur additional cost.

Thus, this software solution is cheaper but has two disadvantages. First, the address protection provided by the memory management unit is lost, which increases the chances of system failures. Second, a linear region of virtual addresses may not necessarily translate to a contiguous region in physical memory space, if a paged system is employed. Therefore, the software has to not only translate the addresses, but also break up single two-dimensional graphics operations into multiple operations that operate separately on each page. This additional overhead of a conventional solution reduces performance.

An embodiment of the invention, on the other hand, may provide a solution to some of these problems. These solutions are achievable because the graphics coprocessor works on the same virtual addresses as the software.

Another aspect of an embodiment of the invention is its flexibility. For example, a conventional graphics processor is an autonomous device that receives commands from the CPU. These received commands are usually implemented in high level commands, in order to attempt to reduce the overhead of the communication between the CPU and the graphics processor. These received high level commands are, e.g., commands that define operations on entire rectangular regions.

On the other hand, an embodiment of the invention is very closely coupled with the CPU and has relatively no overhead in accepting commands. Here, in this example, a command takes approximately no longer than any other CPU instruction. Thus, this exemplary embodiment is able to perform with relatively lower level commands. Thus, the flexibility of various embodiments of the present invention is increased to comprise operations that can be conceived by combining various arrangements of the low level commands.

There are also various differences and potential advantages as compared with the conventional solutions previously described. For example, an embodiment of this invention may be much simpler, and therefore may be implemented in a smaller package and/or require less expense, than a conventional independent graphics processor. This simplicity is because much of the processing is still performed in the software by the CPU. Thus, in a preferred embodiment, only the time-critical inner loop processing is performed in hardware. In this example, the CPU performs address calculations, e.g., the pixel coordinates to memory address translation, and manages line to line transitions.

As an extension to the CPU, an embodiment of this invention can take advantage of the CPU's cache for additional performance, for at least off-screen data. However, the on-screen data is not usually cached. In contrast, a conventional graphics processor does not have access to this cache, or would have to implement its own access at an additional cost. A cache is advantageous when rendering text, because characters are often repeated. Therefore, the characters will already be loaded into the cache.

Figure 3:
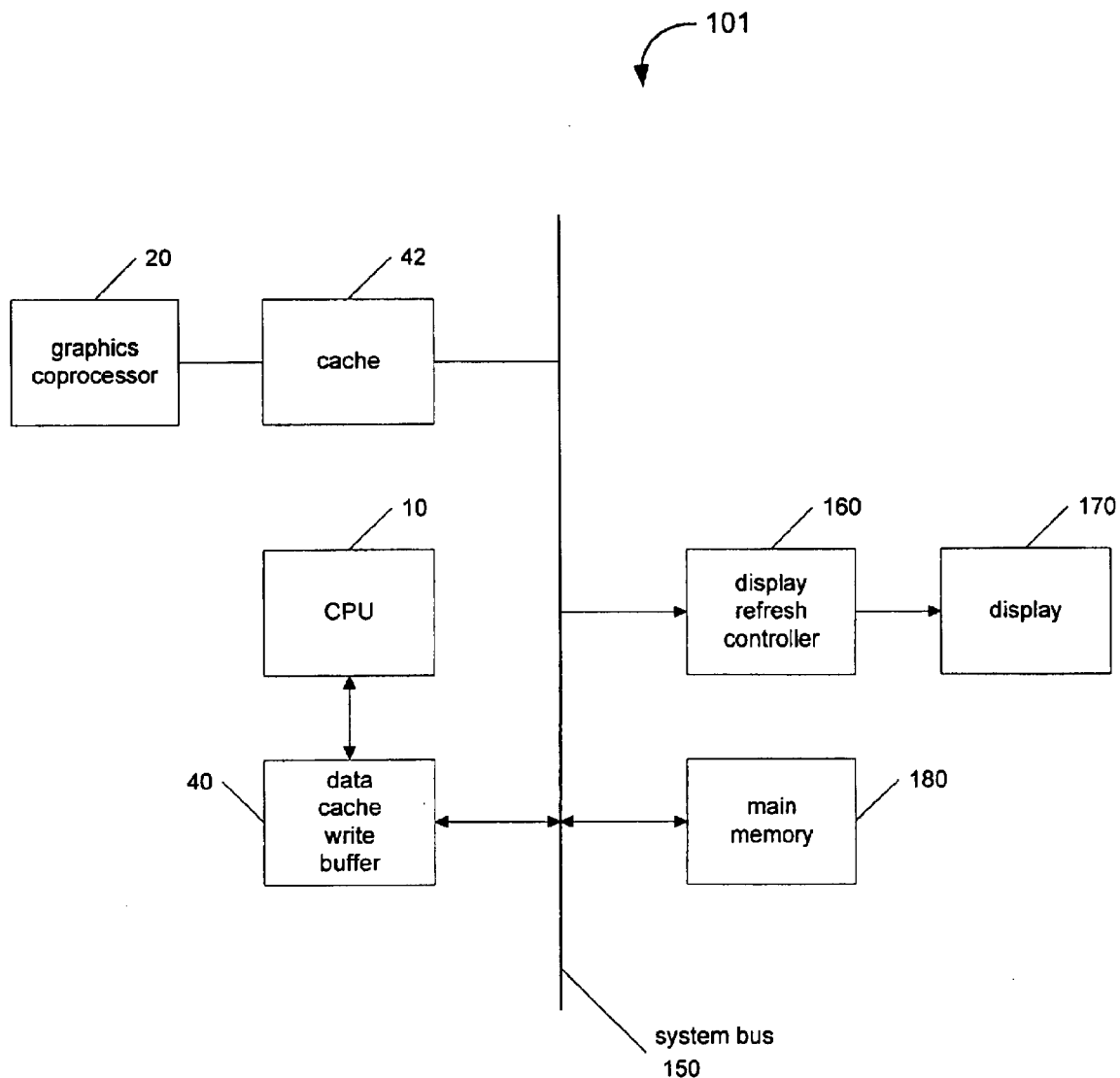
FIG. 3 is an illustration of a simplified block diagram of an exemplary system configuration.

As illustrated in FIG. 3, the conventional graphics processor 20 may be provided with its own cache as shown in this arrangement. The graphics processor 20 is connected to a cache portion 42 that is in turn connected to the system bus 150. A central processing unit 10 is connected via the data cache/write buffer 40 to the system bus 150 as well. Also connected to the system bus 150 is the display refresh controller 160 that may in turn be connected to a display device 170. Finally, the main memory 180 is also connected to the system bus 150.

In yet another arrangement, access to cache 42 may be augmented, or altered, so as to provide the graphics processor 20 with access to data cache 40 via system bus 150. Alternately, cache 42 may comprise a portion of data cache 40.

A preferred embodiment of this invention may also be more suited to a low cost system than a MMX-type solution, because an MMX solution only operates on a word at a time, e.g., 64 bits, and relies on a more expensive 64 bit datapath to the memory.

However, in yet another embodiment, a 32 bit MMX-type solution can be envisaged. But, this 32 bit arrangement would not likely realize as much of an improvement, as compared with implementing a preferred embodiment that exists entirely in software that utilizes a 32 bit non-MMX CPU. For example, an MMX system has to load operands one word at a time and cannot automatically perform two-dimensional operations. Also, additional instructions are required to combine the operands for the desired operation before storing the result back to memory.

Now, in order to more fully understand some of the various embodiments of the present invention, the following detailed discussion is set forth, that includes specific exemplary embodiments.

In this detailed discussion, a preferred embodiment is described. This preferred embodiment comprises a graphics coprocessor that is a 2D graphics accelerator for the ARM9 RISC Core. This preferred embodiment is not an independent graphics rendering engine as are most traditional graphics accelerators. Instead, this preferred embodiment processes sequential data provided by the CPU, performs graphics operations on the data and then returns sequential data to the CPU. The CPU is still intimately involved in graphics rendering, performing all of the address and extent calculations, dispatching the graphics coprocessor instructions, and fetching and returning the data from main memory.

While there is some loss of potential overlap of rendering time and CPU time compared to a traditional graphics accelerator, the primary aim of the coprocessor is to use the maximum bandwidth of the memory bus for graphics data. Thus, if the CPU is busy performing other tasks, then it is likely that there would be bus contention anyway. The advantage of this approach is a relatively simple and small sized embodiment, that may translate to a relatively fast and inexpensive solution.

Again, the coprocessor supports BitBlt operations that can have up to four operands, namely, the destination, a source, a pattern and a mask. The source and pattern can be 1 bit per pixel, or the same depth as the destination. By specifying which operands are in use, the BitBlt operation can perform any of the following:

- solid fill, mono or colour pattern fill, 1 op BitBlt (e.g. invert), copy,
- copy with colour expand, 2 operand BitBlt, 3 operand BitBlt, and
- MaskBlt (2 or 3 operand BitBlt with additional mask).

A primary purpose in this embodiment of the coprocessor is to support graphics intensive user interfaces with features such as windows, drop-down menus, scrollable text, images, and 2D animation, and the like.

As is shown in FIG. 1, and in this embodiment, all data reads are provided via the data cache, and data writes return via the write buffer. The cache, write buffer, system memory and display refresh controller are all attached to a common system bus. Further, the data path that has been previously described with respect to FIG. 2, is applicable in this specific embodiment.

Next, more specific details of an implementation of the previously described ARM940-type device are now set forth.

ARM coprocessors support the following instructions. The following are the standard definitions of these instructions and the descriptions below are for the standard interpretation of the instruction fields. However, the graphics coprocessor interprets these fields slightly differently.

The standard instructions may comprise:

| | |
|---|---|
| MCR | Move the register to the coprocessor register. |
| MRC | Move the coprocessor register to the register. |
| LDC | Load the coprocessor from the memory. |
| STC | Store the coprocessor to the memory. |
| CDP | Coprocessor data processing. |

Macro versions of the graphics coprocessor instructions are available when the appropriate include file is used. For example:

| | |
|---|---|
| MGR | |
| | Move the register to the graphics coprocessor register. |
| MRG | |
| | Move the graphics coprocessor register to the register. |
| PXL | |
| | Perform a pixel load from the memory. |
| PXS | |
| | Perform a pixel store to the memory. |

Next, some of the registers are described.

Register 0, Bank 0 - gcp_dst_addr    is the destination pixel address.

This destination pixel address register specifies the destination address in pixels for both the load and the store instructions. The destination address is the address of the first pixel to be stored on a line. In many cases, the destination must be loaded into the FIFO before it can be stored, in which case this register specifies the first pixel to be loaded as well. Although it is safe to supply the entire pixel address, it doesn't need to be, as the pixel address only needs to be enough bits to specify the pixel within a word, and any other bits are discarded.

This register is not modified by the coprocessor and can be loaded just once when processing a rectangular region of pixels. Even if multiple FIFO transfers are required per line, the destination address always refers to the first pixel of each line and is ignored for additional transfers on the same line.

The destination must be specified before loading any operand into the FIFO, because the relative alignment between the destination and other operands needs to be known at load time.

The destination is always specified in pixels of the current bits per pixel.

Register 1, Bank 0 - gcp_src_addr    is the source pixel address.

This source pixel address register specifies the source address in pixels for load instructions. Although it is safe to supply the entire pixel address it does not need to be, as the pixel address only needs to be enough bits to specify the pixel within a word, and any other bits are discarded.

This source pixel address register is not modified by the coprocessor and can be loaded just once when processing a rectangular region of pixels. Even if multiple FIFO transfers are required per line, the source address always refers to the first pixel of each line and is ignored for additional transfers on the same line.

This source pixel address register is ignored if the source is not involved in the operation, i.e., if the source operand is not specified in the control register.

The source is either specified in pixels of the current bits per pixel, or at 1 bpp if the source expansion is enabled.

Register 2, Bank 0 - gcp_pat_addr    is the pattern pixel address.

This pattern pixel address register specifies the pattern address in pixels for the load instructions. Although it is safe to supply the entire pixel address, it does not need to be supplied in its entirety. The pixel address only needs to be enough bits to specify the pixel within a word, and any other bits are discarded.

This pattern pixel address register is not modified by the coprocessor and can be loaded just once when processing a rectangular region of pixels. The source pixel within the pattern is automatically wrapped around the line in the pattern as the pattern repeats.

This pattern pixel address register is ignored if the pattern is not involved in the operation, i.e., the pattern operand is not specified in the control register.

The pattern is either specified in pixels of the current bits per pixel, or at 1 bpp if the pattern expansion is enabled.

However, in a preferred implementation, this register must be set to the same value as the destination pixel address. The coprocessor does not support unaligned patterns. To achieve unaligned patterns, the software must rotate the pattern itself before passing it to the coprocessor.

Register 3, Bank 0 - gcp_msk_addr    is the mask pixel address.

This mask pixel address register specifies the mask address in pixels for the load instructions. Although it is safe to supply the entire pixel address, it doesn't need to be supplied, as there only needs to be enough bits to specify the pixel within a word, and any other bits are discarded.

This mask pixel address register does not get modified by the coprocessor and can be loaded just once when processing a rectangular region of pixels. Even if multiple FIFO transfers are required per line, the mask address always refers to the first pixel of each mask line, and is ignored for additional transfers on the same line.

This mask pixel address register is ignored if the mask is not involved in the operation, i.e., the mask operand is not specified in the control register. The mask is also ignored in text mode.

The mask is always specified in pixels of 1 bpp because masks are always 1 bpp.

Register 4, Bank 0 - gcp_fg_col    is the foreground colour.

This foreground colour register specifies the foreground colour used when performing colour expansion. Colour expansion occurs when the source or pattern is 1 bpp, and the destination is greater than 1 bpp. The foreground colour is always the colour specified by a zero in the source or the pattern.

The foreground colour is also the colour used when performing solid fill.

The colour should always be replicated to fill bits [15:0]. For example, if at 8 bits/pixel, bits [15:8] should be a copy of bits [7:0].

Register 5, Bank 0 - gcp_bg_col    is the background colour.

This background colour register specifies the background colour used when performing colour expansion. Colour expansion occurs when the source or the pattern is 1 bpp, and the destination is greater than 1 bpp. The background colour is always the colour specified by a one in the source or the pattern.

The colour should always be replicated to fill bits [15:0]. For example, if at 8 bits/pixel, bits [15:8] should be a copy of bits [7:0].

| | | |
|---|---|---|
| Register 6, Bank 0 - gcp_dst_cmp_col | | is the destination compare colour. |

This destination compare colour register specifies the colour with which to compare destination pixels. The destination pixel used in the comparison is the original pixel at the destination before any operation is applied.

Destination pixels are only compared when this mode is enabled in the control register. When enabled, a destination pixel that matches the compare colour causes the result pixel to be written to the destination. Otherwise, the result is discarded and the destination is left unmodified.

The colour should always be replicated to fill bits [15:0]. For example, if at 8 bits/pixel, bits [15:8] should be a copy of bits [7:0].

| | |
|---|---|
| Register 7, Bank 0 - gcp_src_cmp_col | is the source compare colour. |

This source compare colour register specifies the colour with which to compare source pixels. The source pixel used in the comparison is the original pixel at the source (after colour expansion, if any), and before any operation is applied.

Source pixels are only compared when this mode is enabled in the control register. When enabled, a source pixel that matches the compare colour causes the result pixel to be discarded, leaving the destination unmodified. Otherwise, the result is written to the destination.

The colour should always be replicated to fill bits [15:0]. For example, if at 8 bits/pixel, bits [15:8] should be a copy of bits [7:0].

| | |
|---|---|
| Register 8, Bank 0 - gcp_control | is the Control Register. |

This Control Register register specifies the type of operation to be performed by the coprocessor. It specifies the raster operation (ROP), which operands are involved, whether the source and destination colour compares are enabled, which operands need to be expanded from 1 bit/pixel, and the expanded bits/pixel.

| | |
|---|---|
| Bits [31:16] | One of 65,536 logical operations (ROPs) |
| Bits [11:8] | 4 bits specifying whether each of the destination, source, pattern and mask operands are involved. |
| Bit [7] | Enables source colour compare |
| Bit [6] | Enables destination colour compare |
| Bits [5:3] | 3 bits specifying whether each of the destination, source, and pattern operands should be expanded from 1 bit per pixel. |
| Bits [2:0] | Bits per pixel of expanded operands, e.g., 0=1bpp, 1=2bpp, 3=4bpp, 4=8bpp, 5=16bpp, and the like. |

| | |
|---|---|
| Register 9, Bank 0 - gcp_count | is the Pixel Count. |

This Pixel Count register specifies the number of pixels on a line involved in the operation. When processing a rectangular region of pixels, this pixel count is the total number of pixels on a line, even if multiple FIFO transfers are required to complete one line. The count is not modified.

| | |
|---|---|
| Register 11, Bank 0 - gcp_pat_size | is the Pattern Size. |

This Pattern Size register specifies the dimensions of the pattern in pixels, and the pattern must be square so this specifies both the width and height. Also, the pattern must be packed so that this Pattern Size register specifies the pitch as well.

The current implementation supports pattern sizes of 8×8, 16×16, or 32 pixels.

| | |
|---|---|
| Register 12, Bank 0 - gcp_pat_line | is the Pattern Start Line. |

This Pattern Start Line register specifies the first line of the pattern to be used for the first line of the destination.

If the pattern is aligned in the y direction, this will merely be the lower bits of the destination y address and, in fact, the entire y address may be written. This is because the upper bits will be discarded. By modifying this value, unaligned patterns can be supported in the y direction. However, this implementation does not support patterns unaligned in the x direction.

This register only needs to be written once for a rectangular region of pixels. An internal copy is incremented after each line is stored to the destination.

Next, a description of the operations comprising a BitBlt, a Raster Ops, a Patterned BitBlt, a Transparency and Colour Keying, and a MaskBlt are set forth.

As to the BitBlt operation, the graphics coprocessor supports BitBit with two coprocessor instructions, PXL and PXS (Pixel Load and Pixel Store). Internal to the coprocessor are four FIFOs that hold the operands. Any one FIFO can be loaded with a PXL instruction, and then up to four FIFOs can be stored with a single PXS instruction. FIFOs are combined using the current graphics operation into one stream as they are written by a PXS instruction.

In addition, there are two other graphics coprocessor instructions, MGR and MRG (Move CPU register to Graphics register, and move Graphics register to CPU register, respectively) that are used to set up the control registers before starting the BitBlt.

The CPU divides up rectangular regions of pixels into lines, and then subdivides the lines into FIFO-sized chunks. The CPU has to know how many pixels will fit in the FIFO and schedules the PXL/PXS instructions accordingly. The total size of all the FIFOs is fixed at 1,024 bits (32, 32 bit registers) so the number of pixels that will fit in the FIFO depend upon the bits per pixel and the number of FIFOs in use. If only one FIFO is in use, it gets all 32 registers, and if four are in use, then each gets only 8 registers.

Pixels per FIFO:

| BPP | 1 FIFO | 2 FIFOS | 3 FIFOS | 4 FIFOS |
|-----|--------|---------|---------|---------|
| 1   | 1024   | 512     | 256     | 256     |
| 2   | 512    | 256     | 128     | 128     |
| 4   | 256    | 128     | 64      | 64      |
| 8   | 128    | 64      | 32      | 32      |
| 16  | 64     | 32      | 16      | 16      |
| 32  | 32     | 16      | 8       | 8       |

PXL and PXS are really LDC and STC coprocessor instructions. LDC represents the instruction "load word(s) from memory into the coprocessor," and STC represents the instruction "store word(s) from the coprocessor to memory." Thus, the address of BitBlt operations is actually determined by the CPU and is not known by the coprocessor. However, because the LDC and STC instructions only support word aligned memory accesses, the compressor does have to handle addressing within words. Also, the word alignment issue requires that the edge conditions have to be handled in a special manner in certain cases.

As to the multiple FIFO operations, if the number of pixels on a line is greater than will fit in the FIFOs, according to the table above, then the operation must be split into multiple FIFO loads/stores.

First, all the control registers are set up, including the gcp_count register, with the total pixel count for an entire line. A CPU register will also need to keep track of the pixel count, or at least the number of FIFOs required. Then, a loop is entered that loads all the operands and stores the result for each FIFO, and the loop repeats with no additional setup required for each iteration. Thus, all the CPU needs to know when to exit the loop. The CPU registers holding the various pixel addresses can be automatically updated using post-index addressing. The coprocessor keeps track of the pixel count internally, performing full FIFO loads or stores on all but the last iteration of the loop, where the coprocessor will then perform just the remainder.

As to the edge conditions, the edge conditions occur when the left or right edge of a rectangular region is not word aligned, i.e., a partial word has to be written to the destination. If this is the case, then the destination must be one of the operands, at least for the words that contain the edges, even if the ROP doesn't include the operand. Therefore, the destination must be read in with a PXL instruction and gcp_op_dst must be set in the control register. This is so the coprocessor can correctly modify the destination without affecting the pixels that lie outside the edges.

If the ROP is a simple copy, or for any ROP that does not involve the destination, then it would be wasteful to read all the destination words for the whole rectangular region. Instead, it is better to optimize it and split the region into up to three rectangles, e.g., the left and right edges that include the destination, and the main body that does not include the destination. This saves having to read the destination for the majority of the words, e.g., when the region is large.

As to the colour expansion, if any operand is to be expanded from 1 bpp, then more pixels will fit in the FIFO for that particular operand, because expansion occurs during the store operation. It is necessary to be aware of the number of pixels that will fit, especially when multiple FIFO load/store operations are in use. For example, at 4 bpp, if the source is 1 bpp, then four times as many pixels will fit into the source FIFO as compared to the destination FIFO. Therefore, the source FIFO should only be loaded with every fourth iteration of the loop.

As to the alignment considerations, BitBlt can cope with any alignment between the source and destination. However, if the destination is not word aligned, then the maximum number of pixels cannot be loaded into the FIFO, because the unwanted pixels on the left margin take up space in the FIFO. If the software does not want to have to decide whether or not all the FIFO can be used, then it is always safe to assume that 32 bits less is sufficient, e.g., 8 pixels at 4 bpp, and 4 pixels at 8 bpp, and so on, so as to avoid any problem.

If the destination is aligned, then it is not necessary to worry about the other operands, because they are aligned to the destination as they are read in.

As to the small FIFO considerations, the FIFOs are pipelined internally, but in the current implementation they are not interlocked. This indicates that it is possible to use a FIFO location before it has been loaded. For large BitBlts this is not a problem, because the start of the FIFO will have been loaded long before the PXS instruction starts storing. However, in small FIFO cases, it is necessary to insert nops, and/or useful instructions, between the last PXL and the PXS.

Consider the following code:

```
pxl   [r1], gcp_fifo_src
pxl   [r0], gcp_fifo-dst
{n instructions}
pxs   [r0]
```

If only one word is loaded by the second PXL instruction, the PXS instruction starts to access that word before it is saved into the FIFO. Therefore, a delay is required.

The number of instructions required is given in the following table, where the value n depends upon the bits per pixel and the number of pixels specified in the count register. The value n also depends upon whether a left or right shift is required to align the operands. If the source address is less than the destination address (within a word) then a right shift is required. Otherwise a left shift is required.

| bits/pixel | Pixel count | | | |
|------------|-------------|---|---|---|
| 1bpp       | <=32        | <=64  | <=96  | >96 |
| 4bpp       | <=8         | <=16  | <=24  | >24 |
| 8bpp       | <=4         | <=8   | <=12  | >12 |
| 16bpp      | <=2         | <=4   | <=6   | >6  |
| Alignment  | n=          | | | |
| same or right shift | 2  | 1 | 0 | 0 |
| left shift | 3           | 2 | 1 | 0 |

As to the raster ops operation, the graphics coprocessor supports four operand raster op codes (ROP4). The four operands are the destination, source, pattern and the mask. A ROP4 is made up of two 8 bit 3 operand raster op codes (ROP3). Thus, a ROP4 is of the form:

Bbbbbbbbffffffff where bbbbbbbb and ffffffff are the background and foreground ROP3s, respectively. Each ROP3 has the destination, source and pattern as its operands. The mask data is used to select which ROP3 to apply. If the mask contains a "0" (zero) the ffffffff ROP3 is used, otherwise the bbbbbbbb ROP3 is used.

If the mask is not used, the ROP3 codes must both be set to the same value. Otherwise, the results are undefined.

ROP3 codes are the same as those defined by Microsoft Windows, i.e., if the input bits are {p,s,d} and the ROP3 is {$r_7,r_6,r_5,r_4,r_3,r_2,r_1,r_0$}, then the result is $r_{\{p,s,d\}}$.

For example, the source copy would be:

| Input | | | result | |
|---|---|---|---|---|
| p | s | d | | |
| 0 | 0 | 0 | 0 | |
| 0 | 0 | 1 | 0 | |
| 0 | 1 | 0 | 1 | |
| 0 | 1 | 1 | 1 | <- read from bottom to top, ROP3 = CCh |
| 1 | 0 | 0 | 0 | |
| 1 | 0 | 1 | 0 | |
| 1 | 1 | 0 | 1 | |
| 1 | 1 | 1 | 1 | |

As to the patterned BitBlt operation, the graphics coprocessor supports patterned BitBlts either as fills, or as ROPs with the source and/or destination. Patterned BitBlt is simply a BitBlt where a pattern is involved as an operand.

The coprocessor supports mono or colour patterns and pattern sizes of 8×8, 16×16 or 32×32.

The pattern FIFO can be loaded once and then a patterned rectangle operation can be performed by just loading the source and/or destination. The only exception is if the pattern is too large to fit into the FIFO. In this case, the pattern that is too large has to be reloaded at some point. This can either be as it is needed, or more efficiently, by breaking the rectangle up into stripes and operating on all the lines that require the first part of the pattern, then reloading the pattern FIFO and operating on the other stripes.

When using patterns, the pattern size and pattern start line registers must be set up. A non-zero start line can be used to operate on patterned areas that do not start on the first line of the pattern. The coprocessor keeps an internal copy of the pattern line that it increments at the end of each line. The coprocessor will also wrap the pattern line according to the pattern size register.

If the pattern is too large to fit in the FIFO, it may be necessary to adjust the value written to the pattern start line register, because it is not permitted to be outside the range of the FIFO. Also, the automatic wrapping does not apply in this case, because it will be necessary to reload the pattern FIFO when the line number wraps.

As to the pattern alignment operation, the graphics coprocessor does not support unaligned patterns, i.e., the pattern must be the same alignment as the destination. In practice, this indicates that the pattern address register must be set to the same address as the destination address. If unaligned patterns are desired, e.g., for patterns aligned to window origins, the pattern must be pre-aligned (rotated) by the software before it is used.

As to the transparency and colour keying operation, the transparency is where the source bitmap has one colour defined as transparent, i.e., the destination is not modified when the source pixel matches the transparent colour. Transparency is also known as the source colour compare.

Colour Keying is where one colour in the destination is defined as the keying colour, i.e., the result is only written if the destination pixel matches the keying colour. Colour keying is also known as the destination colour compare.

Transparency can be used for various effects, such as sprites and "blue-screening." Colour keying can be used to display video in non-rectangular regions.

Colour compare modes must be enabled in the control register, gcp_control, and the compare colours set up in gcp_dst_cmp_col and gcp_src_cmp_col.

If both the destination and source colour compares are enabled, then the destination will only be modified according to the following table:

| | Destination | | | |
|---|---|---|---|---|
| Source | dst | dcc | scc |
| src | dst | src | scc |
| dcc | dst | dcc | scc |
| scc | dst | dcc | scc | dst = arbitrary destination pixel
src = arbitrary source pixel
dcc = pixel matches gcp_dst_cmp_col
scc = pixel matches gcp_src_cmp_col As to the MaskBlt A operation, the graphics coprocessor supports MaskBlt. MaskBlt is the same as the standard 3 operand BitBlt, except that there is an additional operand, the mask, that decides whether to use the foreground or background ROP3. A zero in the mask indicates to use the foreground ROP3 and a one indicates to use the background ROP3.

A typical use for the MaskBlt is the Microsoft Windows MaskBlt( ) function which is identical to this hardware operation. It is used to copy arbitrary shapes to the screen where the mask defines the shape of the area to copy. In this case, the background ROP would be leave-alone and the foreground ROP would be SRCCOPY.

The invention has been described in reference to particular embodiments as set forth above. However, only the preferred embodiment of the present invention, but a few examples of its versatility are shown and described in the present disclosure. It is to be understood that the present invention is capable of use in various other combinations and environments, and is capable of changes or modifications within the scope of the inventive concept as expressed herein. Also, many modifications and alternatives will become apparent to one of skill in the art without departing from the principles of the invention as defined by the appended claims.

The foregoing description of embodiments of the present invention are described for the purpose of illustration and description of aspects of the invention. It is not intended to limit the invention to the implementations described. The embodiments described are not exhaustive in providing a description of the form and substance of the invention and variations, modifications, and implementations are possible in light of the preceding teachings. It is intended that the invention not be limited by the foregoing description, but instead by the claims appended below.

What is claimed is:

1. An apparatus for processing graphics, comprising:
   a central processing unit for managing graphics and outputting to a display controller,
   a data cache memory, coupled between the central processing unit and a system bus, and
   a graphics coprocessor coupled with the central processing unit through a connection that is free of the system bus, wherein the graphics coprocessor architecturally extends an instruction set of the central processing unit and wherein the connection comprises an interface having a control logic, a pixel processing logic, a control register, and a memory device.

2. An apparatus as recited in claim 1, wherein the graphics coprocessor accesses the data cache memory by utilizing the coupling between the graphics coprocessor and the central processing unit.

3. An apparatus as recited in claim 1, further comprising:
a write buffer memory, that is coupled to the system bus, and
a system memory device, that is coupled to the system bus, wherein data is read from the system memory device and the data is stored in the data cache, and wherein at least a portion of the data is written to the write buffer, at least a portion of the data is read from the system memory, and the read data is converted into a signal that is output to a display.

4. An apparatus as recited in claim 3, wherein
storing the data in the data cache is performed such that a subsequent access to a same location only requires an access to the data cache memory.

5. An apparatus as recited in claim 3, wherein writing of the data to the write buffer is performed so that a write is queued up for transmission to a main memory.

6. An apparatus as recited in claim 1, wherein the central processing unit communicates with the system bus via at least one of a data cache and a write buffer.

7. An apparatus as recited in claim 1, further comprising:
a main memory, wherein the central processing unit communicates with the main memory via at least one of the data cache and a write buffer.

8. An apparatus as recited in claim 1, wherein the graphics coprocessor comprises a logic extension of the central processing unit.

9. An apparatus as recited in claim 1, wherein the graphics coprocessor comprises a software extension of the central processing unit.

10. An apparatus as recited in claim 1, wherein the graphics coprocessor utilizes a data cache and write buffer utilized by the central processing unit.

11. An apparatus as recited in claim 1, wherein the graphics coprocessor is integral with the central processing unit.

12. An apparatus as recited in claim 1, wherein the control logic provides a path for returning data to the central processing unit.

13. An apparatus as recited in claim 1, wherein the control logic provides hand-shake signals to inform the central processing unit when an instruction is complete.

14. An apparatus as recited in claim 1, wherein the control register comprises a pixel count parameter.

15. An apparatus as recited in claim 1, wherein the control register comprises a bits per pixel parameter.

16. An apparatus as recited in claim 1, wherein the control register comprises a raster operation code parameter.

17. An apparatus as recited in claim 1, wherein the control register comprises a foreground color parameter and a background color parameter.

18. An apparatus as recited in claim 1, wherein the memory device is a pixel first-in-first-out (FIFO) array.

19. An apparatus as recited in claim 18, wherein pixel data is loaded into the FIFO array.

20. An apparatus as recited in claim 19, wherein the pixel processing logic processes the pixel data to render graphics.

21. A method for processing graphics, comprising the steps of:
providing a central processing unit for managing graphics and outputting to a display controller,
providing a data cache memory, coupled between the central processing unit and a system bus, and
coupling a graphics coprocessor to the central processing unit through a connection that is free of the system bus, wherein the graphics coprocessor architecturally extends an instruction set of the central processing unit and wherein the connection comprises an interface having a control logic, a pixel processing logic, a control register, and a memory device.

22. A method as recited in claim 21, further comprising the step of:
providing an access between the graphics coprocessor and at least one of the data cache memory and a write buffer memory by utilizing the coupling between the graphics coprocessor and the central processing unit.

23. A method as recited in claim 21, further comprising the steps of:
providing an access to at least one of the data cache memory and a write buffer memory by the graphics coprocessor, and
utilizing the coupling between the graphics coprocessor and the central processing unit to provide the access.

24. A method as recited in claim 21, wherein the graphics coprocessor utilizes a data cache and write buffer utilized by the central processing unit.

25. A method for processing graphics, comprising:
communicating data directly between a central processing unit and a graphics coprocessor, wherein the central processing unit manages graphics and outputs to a display controller via a system bus and is coupled with the graphics coprocessor via a connection that is free of the system bus;
accessing at least one of a data cache memory and a write buffer memory by the graphics coprocessor;
utilizing the coupling between the graphics coprocessor and the central processing unit to perform the accessing step; and
architecturally extending an instruction set of the central processing unit utilizing the coupling between the graphics coprocessor and the central processing unit and wherein the coupling comprises an interface having a control logic, a pixel processing logic, a control register, and a memory device.

26. A method as recited in claim 25, further comprising the steps of:
reading data from a system memory device;
storing the data in the data cache;
writing at least a portion of the data to the write buffer;
reading at least a portion of the data from the system memory; and
converting the read data into a signal that is output to a display.

27. A method as recited in claim 25, further comprising communicating between the central processing unit and a system bus via at least one of a data cache and a write buffer.

28. A method as recited in claim 25, further comprising communicating between the central processing unit and a main memory via at least one of a data cache and a write buffer.

29. A method as recited in claim 25, further comprising storing the data in the data cache such that a subsequent access to a same location only requires an access to the data cache memory.

30. A method as recited in claim 25, further comprising writing the data to the write buffer, so that a write is queued up for transmission to a main memory.

31. A method as recited in claim 25, wherein the graphics coprocessor comprises at least one of a logic extension and a software extension of the central processing unit.

* * * * *